US011341677B2

(12) United States Patent
Ohashi

(10) Patent No.: US 11,341,677 B2
(45) Date of Patent: May 24, 2022

(54) POSITION ESTIMATION APPARATUS, TRACKER, POSITION ESTIMATION METHOD, AND PROGRAM

(71) Applicant: SONY INTERACTIVE ENTERTAINMENT INC., Tokyo (JP)

(72) Inventor: Yoshinori Ohashi, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 55 days.

(21) Appl. No.: 16/968,036

(22) PCT Filed: Mar. 1, 2018

(86) PCT No.: PCT/JP2018/007715
§ 371 (c)(1),
(2) Date: Aug. 6, 2020

(87) PCT Pub. No.: WO2019/167213
PCT Pub. Date: Sep. 6, 2019

(65) Prior Publication Data
US 2021/0192781 A1 Jun. 24, 2021

(51) Int. Cl.
G06T 7/73 (2017.01)
G02B 27/01 (2006.01)
G06T 7/20 (2017.01)

(52) U.S. Cl.
CPC ............ G06T 7/74 (2017.01); G02B 27/0172 (2013.01); G06T 7/20 (2013.01); G06T 2207/10028 (2013.01)

(58) Field of Classification Search
CPC ......... G06T 7/246; G06T 7/248; G06T 7/292; G06T 7/70; G06T 7/73; G06T 7/74; G06T 2200/04; G06T 2207/30244
See application file for complete search history.

(56) References Cited

U.S. PATENT DOCUMENTS

2012/0249591 A1 10/2012 Maciocci et al.
2014/0225985 A1* 8/2014 Klusza et al. ....... H04N 13/271
348/43

(Continued)

FOREIGN PATENT DOCUMENTS

JP 2015-228256 A 12/2015
JP 2016-524128 A 8/2016

(Continued)

OTHER PUBLICATIONS

International Preliminary Report on Patentability dated Sep. 10, 2020, from the corresponding PCT/JP2018/007715, 19 sheets.

(Continued)

Primary Examiner — Andrew W Johns
(74) Attorney, Agent, or Firm — Katten Muchin Rosenman LLP

(57) ABSTRACT

A position estimation apparatus, a tracker, a position estimation method, and a program which enable estimation of the position or orientation of each of plural trackers in a common coordinate system are provided. A point cloud storage section (80) stores a common point cloud with positions expressed using a common coordinate system. A position estimation section (86) estimates the position or orientation of a first tracker in the common coordinate system on the basis of the common point cloud and first feature point data. The position estimation section (86) estimates the position or orientation of a second tracker in the common coordinate system on the basis of the common point cloud and second feature point data.

8 Claims, 15 Drawing Sheets

(56) References Cited

U.S. PATENT DOCUMENTS

| | | | |
|---|---|---|---|
| 2014/0315570 A1 | 10/2014 | Yun et al. | |
| 2014/0368537 A1 | 12/2014 | Salter et al. | |
| 2015/0235447 A1* | 8/2015 | Abovitz et al. ...... | G01B 11/303 345/633 |
| 2019/0266748 A1* | 8/2019 | Ahmad et al. ............ | G06T 7/74 |

FOREIGN PATENT DOCUMENTS

| | | |
|---|---|---|
| JP | 2016-525741 A | 8/2016 |
| WO | 2013/069050 A1 | 5/2013 |

OTHER PUBLICATIONS

International Search Report and Written Opinion dated May 22, 2018, from the corresponding PCT/JP2018/007715, 11 sheets.
Notice of Reasons for Refusal dated Mar. 9, 2021, from Japanese Patent Application No. 2020-503199, 5 sheets.

* cited by examiner

FIG.3
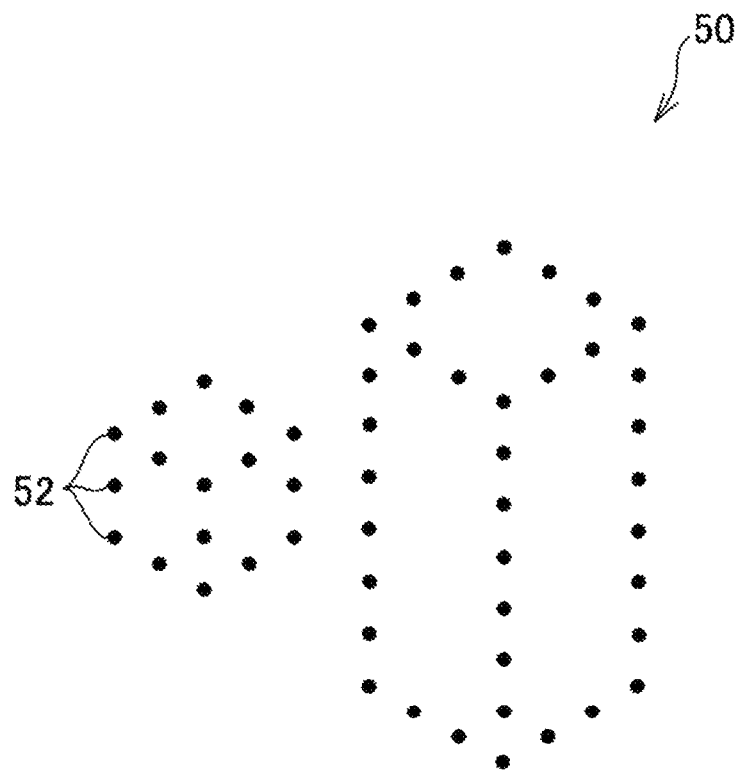
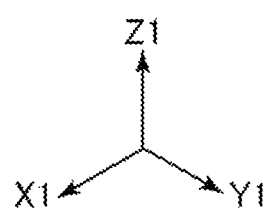

FIG.5
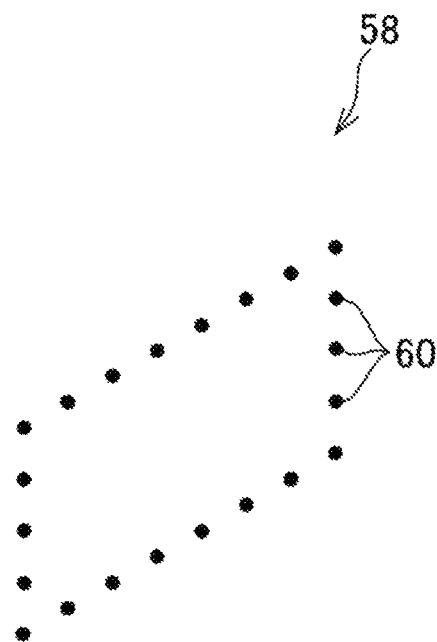
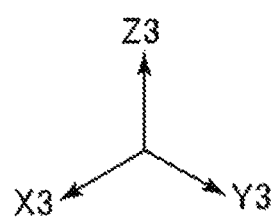
FIG.6
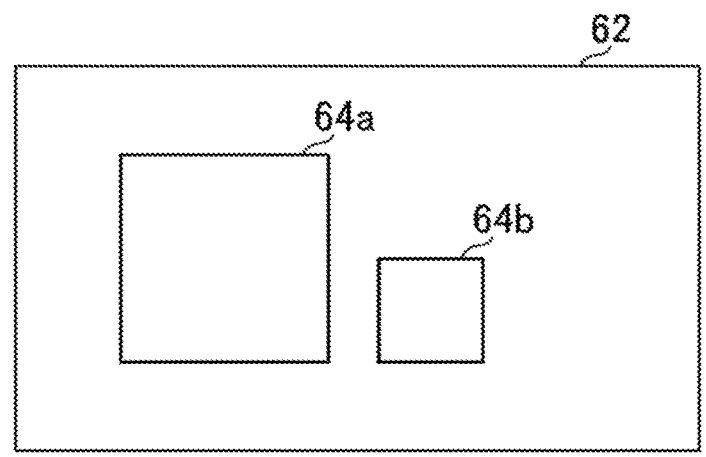

FIG. 9
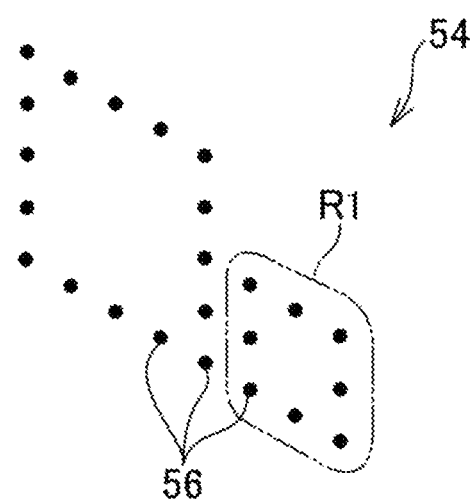
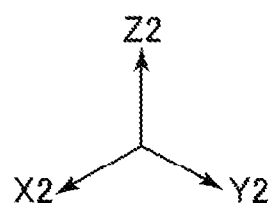

FIG.10
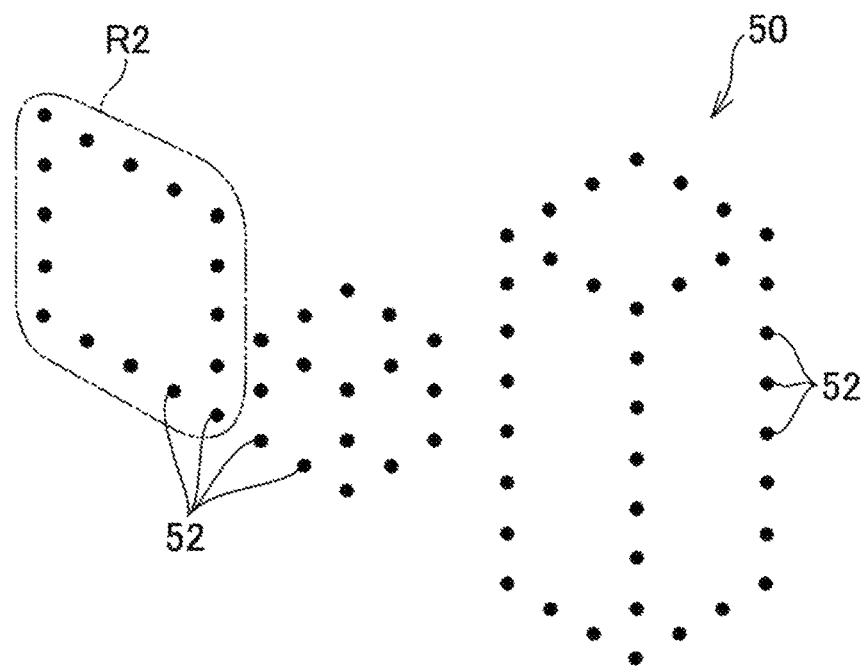
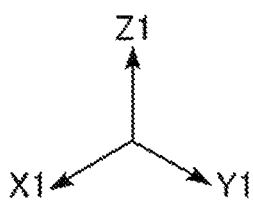
FIG.11
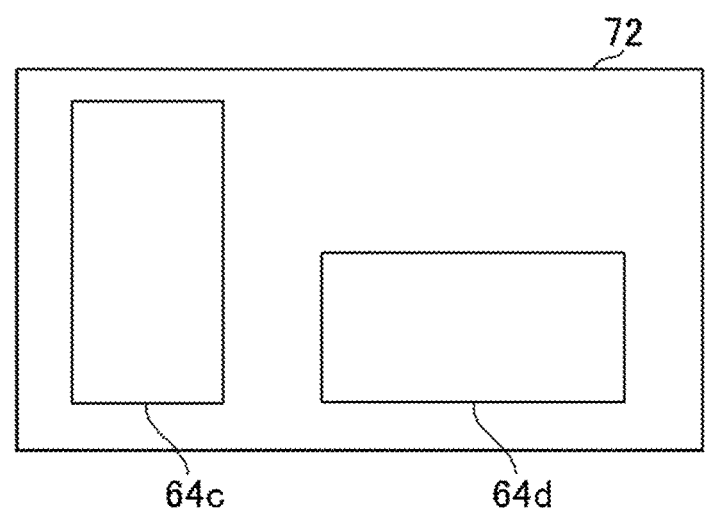

FIG.13
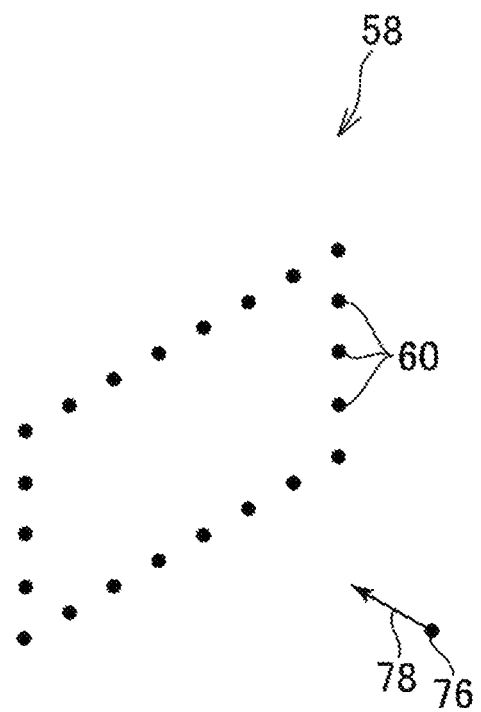
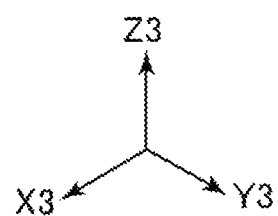

FIG.17

| TRACKER ID | REFERENCE POINT CLOUD DATA |
|---|---|
| 001 | FIRST INDIVIDUAL POINT CLOUD |
| 002 | SECOND INDIVIDUAL POINT CLOUD |

POSITION ESTIMATION APPARATUS, TRACKER, POSITION ESTIMATION METHOD, AND PROGRAM

TECHNICAL FIELD

The present invention relates to a position estimation apparatus, a tracker, a position estimation method, and a program.

BACKGROUND ART

A SLAM (Simultaneous Localization and Mapping) technique for estimating the position of a tracker and generating an environment map is known.

In the SLAM technique, feature point data including plural feature points is generated on the basis of sensing data acquired by the tracker, such as a captured image captured by a camera included in the tracker, for example. Then, estimation of the position or orientation of the tracker and update of the environment map are performed on the basis of a result of comparing the generated feature point data with the environment map, which is a point cloud stored in advance.

SUMMARY

Technical Problem

The inventor has been considering application of the SLAM technique to a game or the like in which plural users each wearing a tracker participate. In such a game or the like, it is necessary to estimate the position or orientation of each of the trackers in a common coordinate system shared by the trackers.

However, the position and orientation of the tracker estimated by the SLAM technique are merely relative to the position and orientation of the tracker at a certain time. Therefore, estimation of the position and orientation of each of the trackers using the SLAM technique does not enable the estimated position and orientation to be mapped onto the common coordinate system. Accordingly, it is impossible to estimate the position or orientation of each of the trackers in the common coordinate system.

The present invention has been conceived of in view of the above problem, and an object of the present invention is to provide a position estimation apparatus, a tracker, a position estimation method, and a program which enable estimation of the position or orientation of each of plural trackers in a common coordinate system.

Solution to Problem

To solve the above problem, a position estimation apparatus according to the present invention includes a point cloud storage section that stores a common point cloud with positions expressed using a common coordinate system and an estimation section that estimates a position or orientation of a first tracker in the common coordinate system and a position or orientation of a second tracker in the common coordinate system. The estimation section estimates the position or orientation of the first tracker in the common coordinate system on the basis of the common point cloud and first feature point data indicating relative positions of plural feature points and generated on the basis of first sensing data acquired by the first tracker. The estimation section estimates the position or orientation of the second tracker in the common coordinate system on the basis of the common point cloud and second feature point data indicating relative positions of plural feature points and generated on the basis of second sensing data acquired by the second tracker.

In one embodiment of the present invention, the position estimation apparatus further includes a transmission section, the transmission section transmits data indicating the position or orientation of the first tracker in the common coordinate system to the first tracker, and the transmission section transmits data indicating the position or orientation of the second tracker in the common coordinate system to the second tracker.

In this embodiment, the transmission section may further transmit the data indicating the position or orientation of the second tracker in the common coordinate system to the first tracker, and the transmission section may further transmit the data indicating the position or orientation of the first tracker in the common coordinate system to the second tracker.

Further, in one embodiment of the present invention, the position estimation apparatus further includes an addition section that adds, to the common point cloud, a point or points arranged at a position or positions in the common coordinate system, on the basis of the common point cloud and the first feature point data, the position or positions being associated with a position or positions of one or more of the feature points included in the first feature point data.

Alternatively, the point cloud storage section further stores an individual point cloud with positions expressed using an individual coordinate system different from the common coordinate system; the position estimation apparatus further includes an addition section that adds, to the common point cloud, points corresponding to some of points included in the individual point cloud when it is determined that some of plural points included in the common point cloud coincide with some of the points included in the individual point cloud; before the addition of the points corresponding to the some of the points included in the individual point cloud to the common point cloud is performed, the estimation section estimates a position or orientation of the first tracker in the individual coordinate system on the basis of the individual point cloud and the first feature point data; and after the addition of the points corresponding to the some of the points included in the individual point cloud to the common point cloud is performed, the estimation section estimates the position or orientation of the first tracker in the common coordinate system on the basis of the common point cloud and the first feature point data.

In one embodiment of the present invention, the position estimation apparatus further includes a reception section, the reception section receives the first feature point data from the first tracker, the reception section receives the second feature point data from the second tracker, the estimation section estimates the position or orientation of the first tracker in the common coordinate system on the basis of the first feature point data received by the reception section, and the estimation section estimates the position or orientation of the second tracker in the common coordinate system on the basis of the second feature point data received by the reception section.

Alternatively, the position estimation apparatus further includes a reception section and a feature point data generation section that generates the first feature point data and the second feature point data, the reception section receives the first sensing data from the first tracker, the reception section receives the second sensing data from the second tracker, the feature point data generation section generates the first feature point data on the basis of the received first sensing data, the feature point data generation section generates the second feature point data on the basis of the received second sensing data, the estimation section estimates the position or orientation of the first tracker in the common coordinate system on the basis of the first feature point data generated by the feature point data generation section, and the estimation section estimates the position or orientation of the second tracker in the common coordinate system on the basis of the second feature point data generated by the feature point data generation section.

Another position estimation apparatus according to the present invention includes a point cloud storage section that stores plural point clouds each of which is associated with an area, a position information acquisition section that acquires position information indicating a position of a tracker, a point cloud selection section that selects, from among the plural point clouds, a point cloud associated with the area including the position indicated by the position information, and an estimation section that estimates a position or orientation of the tracker on the basis of the selected point cloud and feature point data indicating relative positions of plural feature points and generated on the basis of sensing data acquired by the tracker.

A tracker according to the present invention includes a transmission section that transmits position information indicating a position of the tracker to a server that stores plural point clouds each of which is associated with an area and a reception section that receives, from the server, data indicating a position or orientation of the tracker estimated in the server, on the basis of a point cloud selected from among the plural point clouds and associated with the area including the position indicated by the position information and feature point data indicating relative positions of plural feature points and generated on the basis of sensing data acquired by the tracker.

A position estimation method according to the present invention includes the steps of estimating a position or orientation of a first tracker in a common coordinate system on the basis of a common point cloud with positions expressed using the common coordinate system and first feature point data indicating relative positions of plural feature points and generated on the basis of first sensing data acquired by the first tracker and estimating a position or orientation of a second tracker in the common coordinate system on the basis of the common point cloud and second feature point data indicating relative positions of plural feature points and generated on the basis of second sensing data acquired by the second tracker.

A program according to the present invention causes a computer to perform a step of estimating a position or orientation of a first tracker in a common coordinate system on the basis of a common point cloud with positions expressed using the common coordinate system and first feature point data indicating relative positions of plural feature points and generated on the basis of first sensing data acquired by the first tracker and a step of estimating a position or orientation of a second tracker in the common coordinate system on the basis of the common point cloud and second feature point data indicating relative positions of plural feature points and generated on the basis of second sensing data acquired by the second tracker.

BRIEF DESCRIPTION OF DRAWINGS

FIG. 3 is a diagram illustrating an example of a common point cloud.

FIG. 5 is a diagram illustrating an example of a second individual point cloud.

FIG. 6 is a diagram illustrating an example of a captured image.

FIG. 9 is a diagram illustrating an example of a first individual point cloud.

FIG. 10 is a diagram illustrating an example of a common point cloud.

FIG. 11 is a diagram illustrating an example of a captured image.

FIG. 13 is a diagram illustrating an example of a second individual point cloud.

FIG. 17 is a diagram illustrating an example of reference management data.

DESCRIPTION OF EMBODIMENT

Hereinafter, one embodiment of the present invention will be described in detail with reference to the accompanying drawings.

Figure 1:
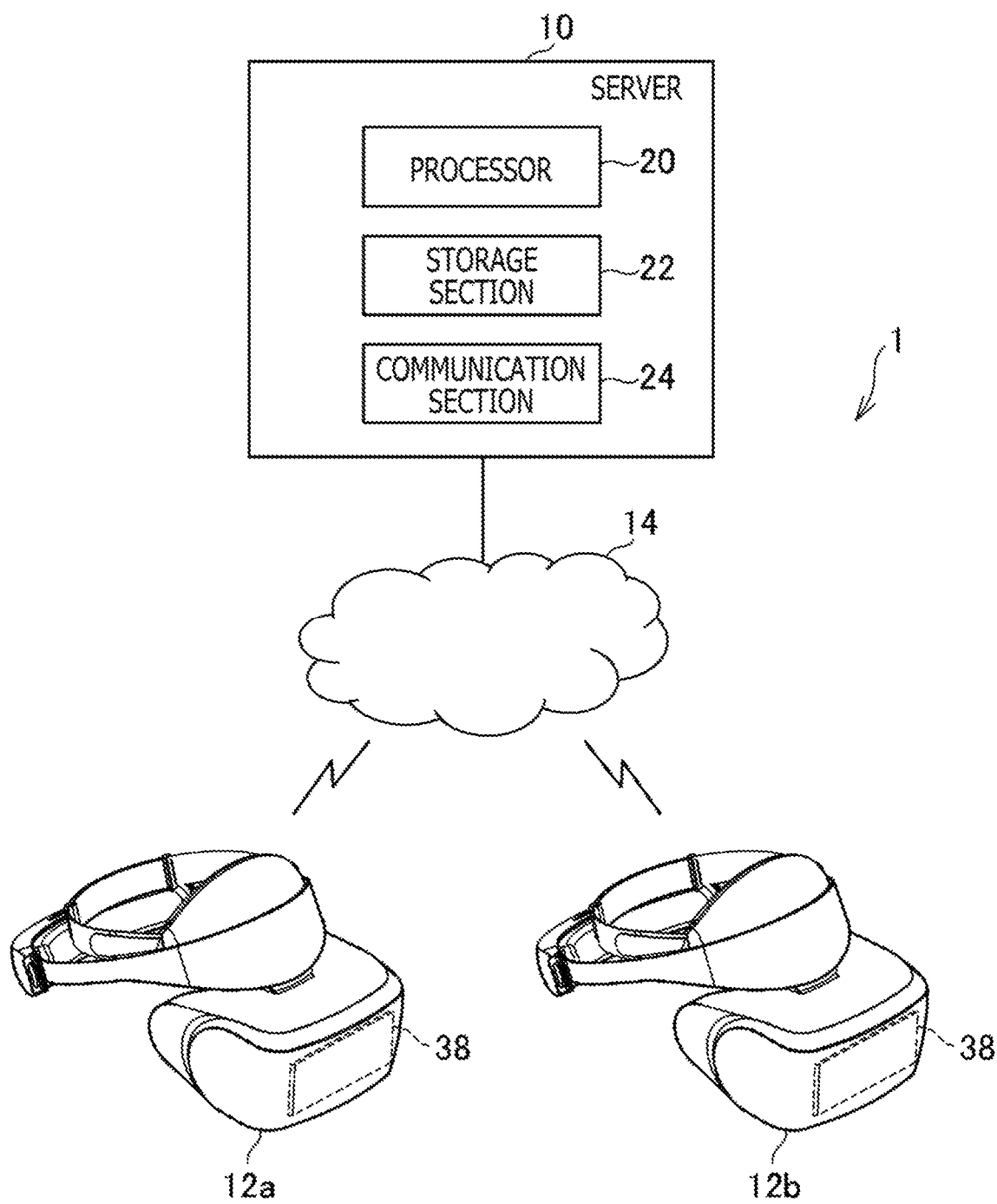
FIG. 1 is a configuration diagram illustrating an example of a position sharing system according to an embodiment of the present invention.

FIG. 1 is a configuration diagram illustrating an example of a position sharing system 1 according to an embodiment of the present invention. As illustrated in FIG. 1, the position sharing system 1 according to the present embodiment includes a server 10 and a plurality of terminals (for example, trackers 12 in the present embodiment). In FIG. 1, a tracker 12a and a tracker 12b are illustrated.

Each of the server 10, the tracker 12a, and the tracker 12b is connected to a computer network 14, such as the Internet. Accordingly, the server 10, the tracker 12a, and the tracker 12b are capable of communicating with one another via the computer network 14.

As illustrated in FIG. 1, the server 10 according to the present embodiment is a server computer including a processor 20, a storage section 22, and a communication section 24, for example. Note that the server 10 may be implemented by a cloud system or a server system having a plurality of casings.

The processor 20 is a program control device, such as a CPU (Central Processing Unit), which operates in accordance with a program installed in the server 10, for example. The storage section 22 is, for example, a storage element, such as a ROM (Read Only Memory) or a RAM (Random Access Memory), a hard disk drive, or the like. A program to be executed by the processor 20 and so on are stored in the storage section 22. The communication section 24 is a communication interface, such as a network board or a wireless LAN (Local Area Network) module.

Each tracker 12 according to the present embodiment is, for example, a device to track the position and orientation of a user who wears the tracker 12 in the present embodiment. In FIG. 1, a head-mounted display (HMD) is illustrated as an example of the tracker 12.

Figure 2:
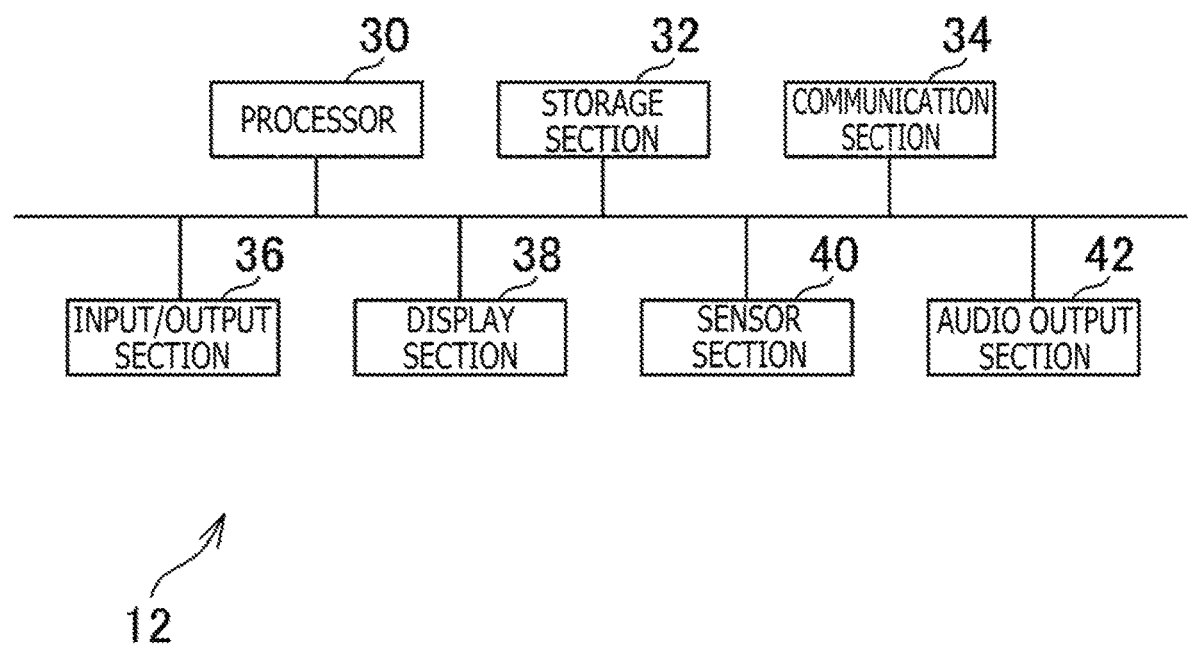
FIG. 2 is a configuration diagram illustrating an example of a tracker according to an embodiment of the present invention.

As illustrated in FIG. 2, the tracker 12 according to the present embodiment includes a processor 30, a storage section 32, a communication section 34, an input/output section 36, a display section 38, a sensor section 40, and an audio output section 42.

The processor 30 is a program control device, such as a microprocessor, which operates in accordance with a program installed in the tracker 12, for example.

The storage section 32 is, for example, a storage element, such as a ROM or a RAM, or the like. A program to be executed by the processor 30 and so on are stored in the storage section 32.

The communication section 34 is, for example, a communication interface, such as a wireless LAN module.

The input/output section 36 is, for example, an input/output port, such as an HDMI (registered trademark) (High-Definition Multimedia Interface) port, a USB (Universal Serial Bus) port, or an AUX (Auxiliary) port.

The display section 38 is, for example, a display, such as a liquid crystal display or an organic EL (Electroluminescence) display, and is disposed on a front side of the tracker 12. In addition, the display section 38 is housed in a casing of the tracker 12. The display section 38 according to the present embodiment is configured to be capable of displaying a three-dimensional image by displaying an image for a left eye and an image for a right eye, for example. Note that the display section 38 may alternatively be configured to be capable of displaying only two-dimensional images, being incapable of displaying three-dimensional images.

The sensor section 40 includes, for example, sensors such as a camera, an inertial sensor (IMU (Inertial Measurement Unit)), a magnetometer (i.e., a direction sensor), and a GPS (Global Positioning System) module. The camera included in the sensor section 40 captures images at a predetermined frame rate, for example. In addition, the magnetometer included in the sensor section 40 outputs data indicating the direction in which the tracker 12 faces, to the processor 30 at the predetermined frame rate. Further, the inertial sensor included in the sensor section 40 outputs data indicating the acceleration, the amount of rotation, the amount of movement, etc., of the tracker 12 to the processor 30 at the predetermined frame rate. Furthermore, the GPS module included in the sensor section 40 outputs data indicating the latitude and longitude of the tracker 12 to the processor 30 at the predetermined frame rate.

The audio output section 42 is, for example, headphones, a loudspeaker, or the like and outputs audio represented by audio data and so on.

In the present embodiment, estimation of the position and orientation of the tracker 12 employing a SLAM (Simultaneous Localization and Mapping) technique is performed in the server 10 in a manner as described below, for example. Then, data indicating the position and orientation thus estimated is provided from the server 10 to the tracker 12.

FIG. 3 is a diagram illustrating an example of a common point cloud 50 managed by the server 10 according to the present embodiment. The common point cloud 50 is used for estimation of the position and orientation of each of the tracker 12a and the tracker 12b. As illustrated in FIG. 3, plural points 52 are included in the common point cloud 50. Positions in the common point cloud 50 according to the present embodiment are expressed using an X1-Y1-Z1 coordinate system. Accordingly, coordinate values expressed using the X1-Y1-Z1 coordinate system are set for each of the plural points 52 included in the common point cloud 50. Hereinafter, the X1-Y1-Z1 coordinate system will be referred to as a common coordinate system. Note here that the coordinate values of each of the points 52 included in the common point cloud 50 may be expressed as, for example, a combination of a latitude, a longitude, and an altitude.

Figure 4:
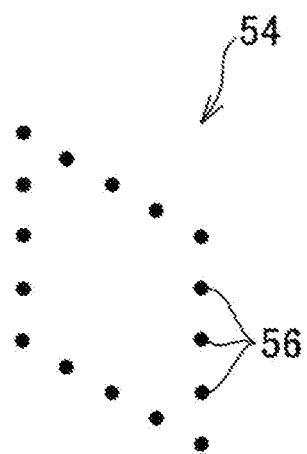
FIG. 4 is a diagram illustrating an example of a first individual point cloud.

FIG. 4 is a diagram illustrating an example of a first individual point cloud 54 managed by the server 10 according to the present embodiment. The first individual point cloud 54 is used for the estimation of the position and orientation of the tracker 12a. As illustrated in FIG. 4, plural points 56 are included in the first individual point cloud 54. Coordinate values expressed using an X2-Y2-Z2 coordinate system are set for each of the plural points 56. Hereinafter, the X2-Y2-Z2 coordinate system will be referred to as a first individual coordinate system.

FIG. 5 is a diagram illustrating an example of a second individual point cloud 58 managed by the server 10 according to the present embodiment. The second individual point cloud 58 is used for the estimation of the position and orientation of the tracker 12b. As illustrated in FIG. 5, plural points 60 are included in the second individual point cloud 58. Coordinate values expressed using an X3-Y3-Z3 coordinate system are set for each of the plural points 60. Hereinafter, the X3-Y3-Z3 coordinate system will be referred to as a second individual coordinate system.

It is assumed that the common coordinate system, the first individual coordinate system, and the second individual coordinate system are independent coordinate systems different from one another in the present embodiment.

In the present embodiment, the estimation of the positions and orientations of the tracker 12a and the tracker 12b is performed on the basis of the common point cloud 50 illustrated in FIG. 3, the first individual point cloud 54 illustrated in FIG. 4, and the second individual point cloud 58 illustrated in FIG. 5.

An example of estimation of the position and orientation of the tracker 12a based on sensing data generated by the sensor section 40 of the tracker 12a will now be described below.

In the present embodiment, images are captured at the predetermined frame rate by the camera included in the sensor section 40 of the tracker 12a. Hereinafter, the images captured in this manner will be referred to as captured images. The captured images correspond to examples of the sensing data generated by the sensor section 40 of the tracker 12a. In FIG. 6, a captured image 62 is illustrated as an example of the captured image captured by the camera included in the sensor section 40 of the tracker 12a. Figures of an object 64a and an object 64b are included in the captured image 62 illustrated in FIG. 6.

Figure 7:
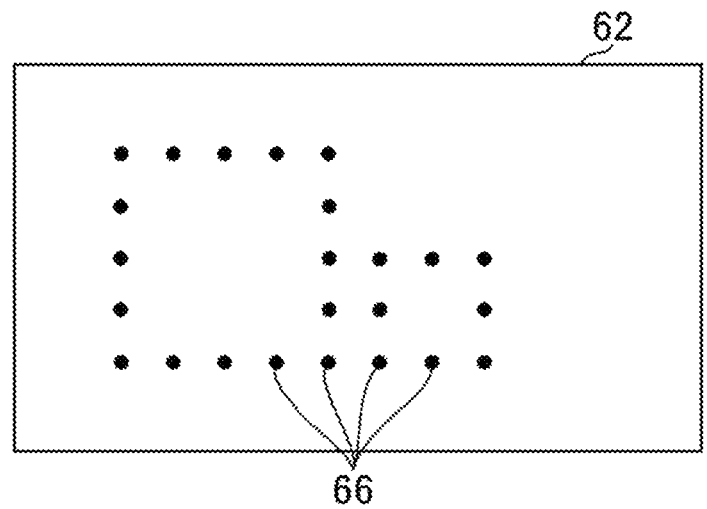
FIG. 7 is a diagram illustrating examples of feature points.

Here, in the present embodiment, for example, plural feature points 66 of the captured image 62 are extracted on the basis of the captured image 62, as illustrated in FIG. 7. In FIG. 7, the feature points 66, which are extracted along edges of the object 64a and the object 64b, are illustrated. Then, feature point data indicating relative positions of the extracted feature points 66 is generated. Here, since the relative positions of the feature points 66 are indicated in the feature point data, the feature point data can be regarded as a type of point cloud.

Here, the positions of the feature points 66 may be expressed by two-dimensional coordinate values (i.e., two-dimensional coordinate values expressed using a two-dimensional camera coordinate system) on a two-dimensional plane formed by the captured image 62. Alternatively, the positions of the feature points 66 may be expressed by, for example, three-dimensional coordinate values (i.e., three-dimensional coordinate values expressed using a three-dimensional camera coordinate system) including the two-dimensional coordinate values on the two-dimensional plane formed by the captured image 62 and a coordinate value corresponding to a depth (in a Z direction).

Figure 8:
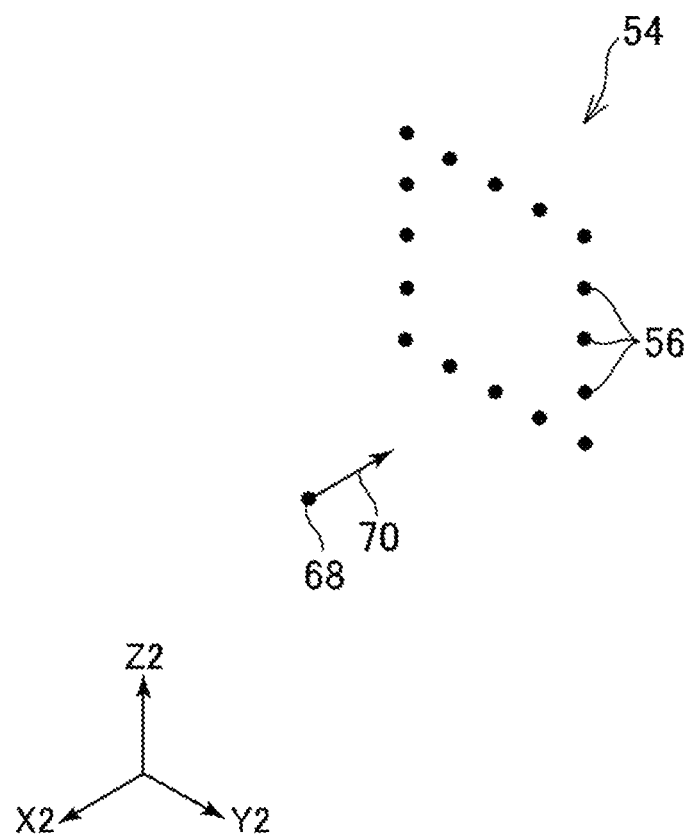
FIG. 8 is a diagram illustrating an example of a first individual point cloud.

Then, in the present embodiment, as illustrated in FIG. 8, a position 68 and an orientation 70 of the tracker 12a are estimated employing the SLAM technique, on the basis of a result of comparing the feature points 66 extracted from the captured image 62 with the points 56 included in the first individual point cloud 54. The position 68 and the orientation 70 estimated here correspond to, for example, the position and the orientation of the tracker 12a at the time of the capturing of the captured image 62. In addition, the position 68 and the orientation 70 estimated in the above manner are expressed using the first individual coordinate system.

Then, in the present embodiment, data indicating the position 68 and the orientation 70 expressed using the first individual coordinate system and estimated in the above manner is transmitted from the server 10 to the tracker 12a. Then, the tracker 12a performs various processes on the basis of the data received.

Then, in the present embodiment, as illustrated in FIG. 9, points 56 corresponding to those of the feature points 66 whose corresponding points 56 are not included in the first individual point cloud 54 are added to the first individual point cloud 54. In the example of FIG. 9, plural points 56 in a region R1 are added to the first individual point cloud 54. Note that, at this time, update of the positions of the points 56 already included in the first individual point cloud 54 may be performed on the basis of the feature points 66.

In this case, addition and update of the points 56 may be performed with respect to the feature points 66 generated a plurality of times. Further, the addition and update of the points 56 may not be performed with respect to, for example, feature points 66, such as those of a shadow, which are affected by the weather or the period of time.

Then, in the present embodiment, the points 56 included in the first individual point cloud 54 and the points 52 included in the common point cloud 50 are compared. Suppose here that some of the points 56 included in the first individual point cloud 54 are determined to coincide with some of the points 52 included in the common point cloud 50, for example. In this case, as illustrated in FIG. 10, points 52 corresponding to those of the points 56 included in the first individual point cloud 54 whose corresponding points 52 are not included in the common point cloud 50 are added to the common point cloud 50. In the example of FIG. 10, plural points 52 in a region R2 are added to the common point cloud 50.

Then, in the present embodiment, after the addition of the points 52 to the common point cloud 50 as described above is performed, feature points extracted from a captured image will be compared with the points 52 included in the common point cloud 50. Accordingly, a position and an orientation of the tracker 12a to be estimated will be expressed using the common coordinate system. Here, data expressed with a latitude, a longitude, and an altitude may be used as data indicating each of the position and the orientation expressed using the common coordinate system.

In this case, points 52 corresponding to those of the feature points whose corresponding points 52 are not included in the common point cloud 50 are added to the common point cloud 50. Note that, at this time, update of the positions of the points 52 already included in the common point cloud 50 may be performed on the basis of the feature points.

In this case, addition and update of the points 52 may be performed with respect to the feature points generated a plurality of times. Further, the addition and update of the points 52 may not be performed with respect to, for example, feature points, such as those of a shadow, which are affected by the weather or the period of time.

An example of estimation of the position and orientation of the tracker 12b based on sensing data generated by the sensor section 40 of the tracker 12b will now be described below.

As in the case of the tracker 12a, in the present embodiment, captured images are captured at a predetermined frame rate by the camera included in the sensor section 40 of the tracker 12b. The captured images correspond to examples of the sensing data generated by the sensor section 40 of the tracker 12b. In FIG. 11, a captured image 72 is illustrated as an example of the captured images captured by the camera included in the sensor section 40 of the tracker 12b. Figures of an object 64c and an object 64d are included in the captured image 72 illustrated in FIG. 11.

Figure 12:
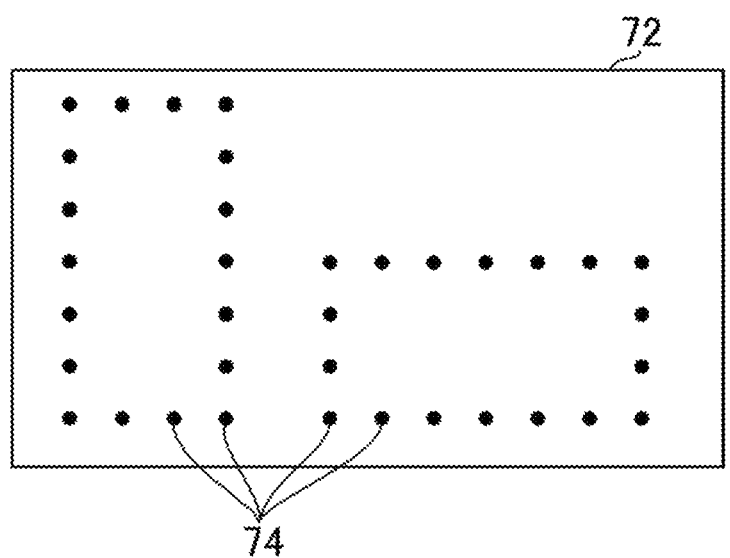
FIG. 12 is a diagram illustrating examples of feature points.

Here, in the present embodiment, for example, plural feature points 74 of the captured image 72 are extracted on the basis of the captured image 72, as illustrated in FIG. 12. In FIG. 12, the feature points 74, which are extracted along edges of the object 64c and the object 64c, are illustrated. Then, feature point data indicating relative positions of the extracted feature points 74 is generated. Here, since the relative positions of the feature points 74 are indicated in the feature point data, the feature point data can be regarded as a type of point cloud.

Here, the positions of the feature points 74 may be expressed by two-dimensional coordinate values (i.e., two-dimensional coordinate values expressed using a two-dimensional camera coordinate system) on a two-dimensional plane formed by the captured image 72. Alternatively, the positions of the feature points 74 may be expressed by, for example, three-dimensional coordinate values (i.e., three-dimensional coordinate values expressed using a three-dimensional camera coordinate system) including the two-dimensional coordinate values on the two-dimensional plane formed by the captured image 72 and a coordinate value corresponding to a depth (in a Z direction).

Then, in the present embodiment, as illustrated in FIG. 13, a position 76 and an orientation 78 of the tracker 12b are estimated employing the SLAM technique, on the basis of a result of comparing the feature points 74 extracted from the captured image 72 with the points 60 included in the second individual point cloud 58. The position 76 and the orientation 78 estimated here correspond to, for example, the position and the orientation of the tracker 12b at the time of the capturing of the captured image 72. In addition, the position 76 and the orientation 78 estimated in the above manner are expressed using the second individual coordinate system.

Then, in the present embodiment, data indicating the position 76 and the orientation 78 expressed using the second individual coordinate system and estimated in the above manner is transmitted from the server 10 to the tracker 12b. Then, the tracker 12b performs various processes on the basis of the data received.

Figure 14:
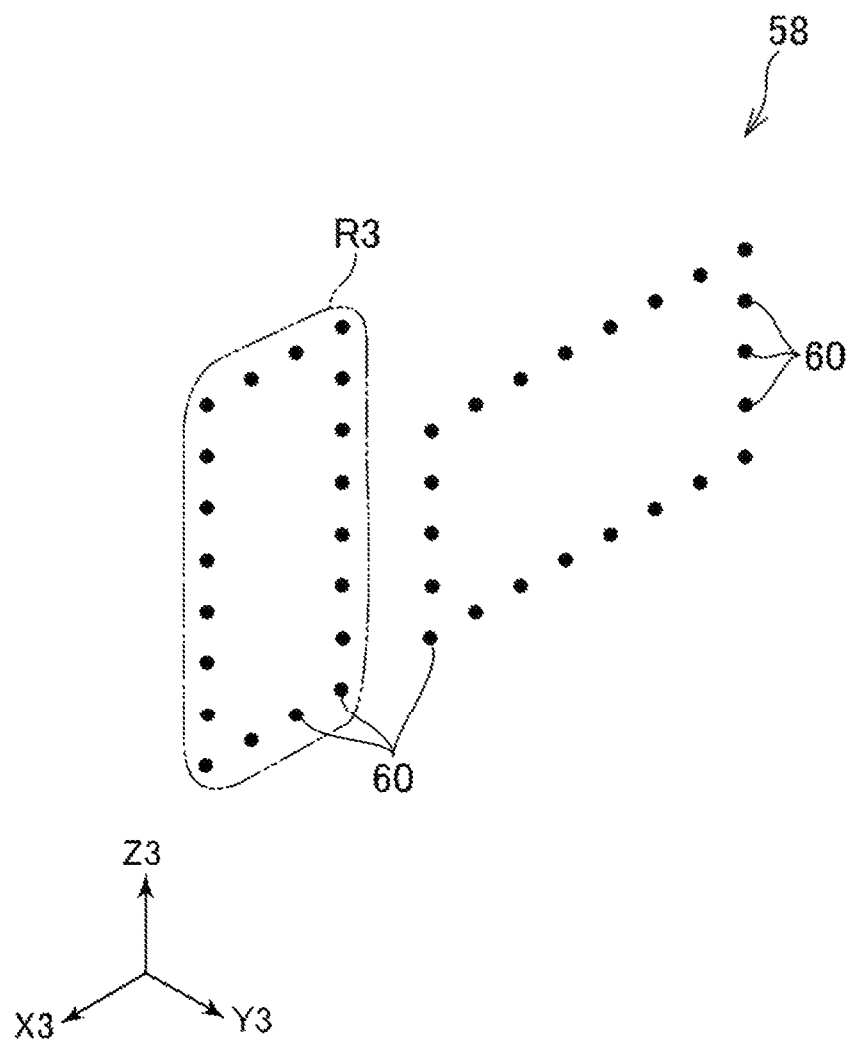
FIG. 14 is a diagram illustrating an example second individual point cloud.

Then, in the present embodiment, as illustrated in FIG. 14, points 60 corresponding to those of the feature points 74 whose corresponding points 60 are not included in the second individual point cloud 58 are added to the second individual point cloud 58. In the example of FIG. 14, plural points 60 in a region R3 are added to the second individual point cloud 58. Note that, at this time, update of the positions of the points 60 already included in the second individual point cloud 58 may be performed on the basis of the feature points 74.

In this case, addition and update of the points 60 may be performed with respect to the feature points 74 generated a plurality of times. Further, the addition and update of the points 60 may not be performed with respect to, for example, feature points 74, such as those of a shadow, which are affected by the weather or the period of time.

Figure 15:
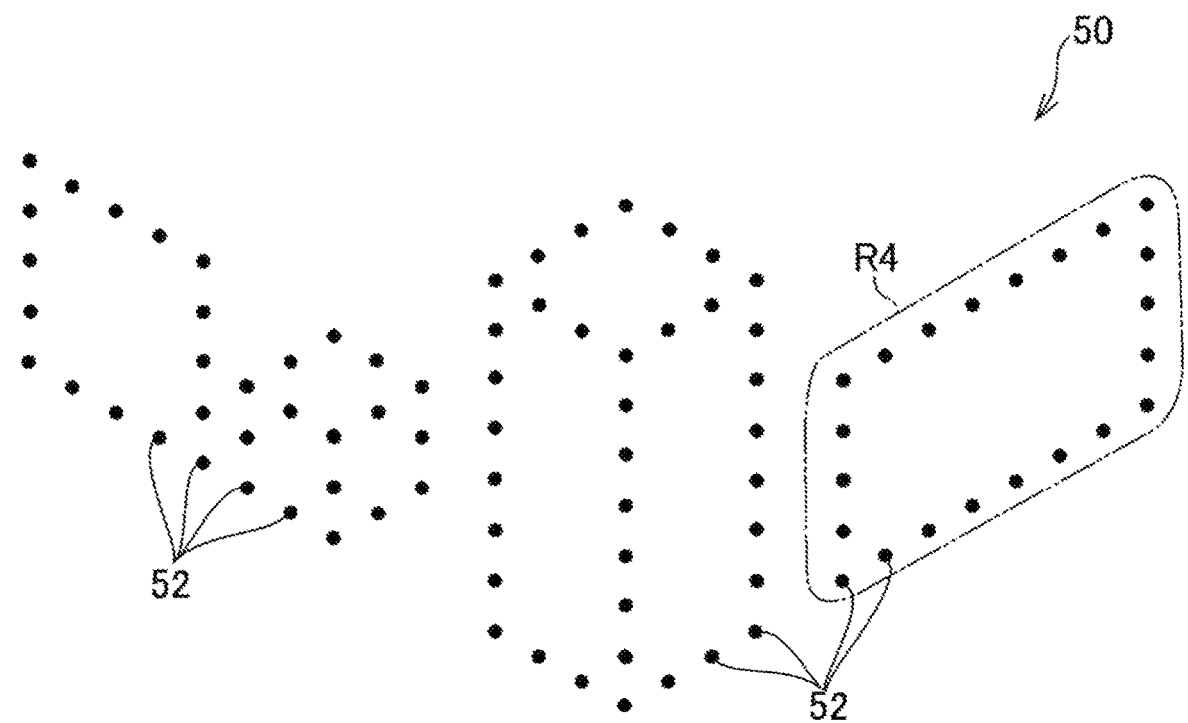
FIG. 15 is a diagram illustrating an example of a common point cloud.

Then, in the present embodiment, the points 60 included in the second individual point cloud 58 and the points 52 included in the common point cloud 50 are compared. Suppose here that some of the points 60 included in the second individual point cloud 58 are determined to coincide with some of the points 52 included in the common point cloud 50, for example. In this case, as illustrated in FIG. 15, points 52 corresponding to those of the points 60 included in the second individual point cloud 58 whose corresponding points 52 are not included in the common point cloud 50 are added to the common point cloud 50. In the example of FIG. 15, plural points 52 in a region R4 are added to the common point cloud 50.

Then, in the present embodiment, after the addition of the points 52 to the common point cloud 50 as described above is performed, feature points extracted from a captured image will be compared with the points 52 included in the common point cloud 50. Accordingly, a position and an orientation of the tracker 12b to be estimated will be expressed using the common coordinate system. Here, data expressed with a latitude, a longitude, and an altitude may be used as data indicating each of the position and the orientation expressed using the common coordinate system.

In this case, points 52 corresponding to those of the feature points whose corresponding points 52 are not included in the common point cloud 50 are added to the common point cloud 50. Note that, at this time, update of the positions of the points 52 already included in the common point cloud 50 may be performed on the basis of the feature points.

In this case, addition and update of the points 52 may be performed with respect to the feature points generated a plurality of times. Further, the addition and update of the points 52 may not be performed with respect to, for example, feature points, such as those of a shadow, which are affected by the weather or the period of time.

As described above, in the present embodiment, the estimation of the position and orientation of the tracker 12 is performed on the basis of the first individual point cloud 54 or the second individual point cloud until the addition of the points 52 to the common point cloud 50 is performed, for example.

Then, in this case, as described above, for example, the data indicating the position and the orientation expressed using the first individual coordinate system is provided to the tracker 12a. Meanwhile, the data indicating the position and the orientation expressed using the second individual coordinate system is provided to the tracker 12b. Accordingly, in this case, a relation between the position and orientation of the tracker 12a and the position and orientation of the tracker 12b cannot be identified.

However, after the addition of the points 52 to the common point cloud 50 is performed, the data indicating the position and the orientation expressed using the common coordinate system is provided to each of the tracker 12a and the tracker 12b. Thus, according to the present embodiment, the estimated position or orientation of the tracker 12 in the common coordinate system can be provided to the tracker 12.

Here, after the addition of the points 52 to the common point cloud 50 is performed, the data indicating the position and orientation of the tracker 12b expressed using the common coordinate system may be provided to the tracker 12a. In addition, after the addition of the points 52 to the common point cloud 50 is performed, the data indicating the position and orientation of the tracker 12a expressed using the common coordinate system may be provided to the tracker 12b. This will enable performance of a process that involves use of the positions and orientations of the two trackers 12a expressed using the coordinate system shared by the two trackers 12, in each of the tracker 12a and the tracker 12b.

In addition, in the present embodiment, in the case where the estimation of the position and orientation of the tracker 12 based on the common point cloud 50 is performed, the position and the orientation expressed using the common coordinate system are provided to the tracker 12 even when the position and orientation of the tracker 12 are estimated for the first time, for example. Here, as described above, data indicating the position of the tracker 12 expressed with a latitude, a longitude, and an altitude may be provided to the tracker 12. This will make it possible to estimate the absolute position and orientation of the tracker 12 even when the position and orientation of the tracker 12 are estimated for the first time.

In addition, in the present embodiment, the number of points 52 included in the common point cloud 50 is increased by each of the trackers 12 performing the estimation of the position and orientation of the tracker 12. Thus, according to the present embodiment, an area covered by the common point cloud 50 shared by the trackers 12 can be widened as processes of estimating the positions and orientations of the trackers 12 are performed. Thus, in the present embodiment, an administrator or the like need not take the trouble to perform a process for widening the area covered by the common point cloud 50.

In addition, the orientation of the tracker 12 may be estimated on the basis of the direction of the tracker 12 measured by the magnetometer included in the sensor section 40 of the tracker 12, for example. Then, the position and orientation of the tracker 12 may be estimated on the basis of the result of estimation of the orientation based on the direction, the feature point data, and the common point cloud 50. This will lead to increased accuracy in the estimation of the position and orientation of the tracker 12.

In addition, common point clouds 50 may be managed via plural databases in the server 10. Then, in each of the databases, a common point cloud 50 for an area (for example, ranges of latitude and longitude) corresponding to that database may be stored. Here, areas corresponding to the common point clouds 50 stored in the respective databases may partly overlap with one another.

Here, on the basis of an approximate latitude and longitude of the tracker 12 measured by the GPS module included in the sensor section 40 of the tracker 12, for example, a database corresponding to an area including the position expressed by this latitude and this longitude may be identified. Then, the position and orientation of the tracker 12 may be estimated on the basis of the common point cloud 50 stored in the identified database and the feature point data. This will make it possible to more accurately estimate the position and orientation of the tracker 12 than when the position and orientation of the tracker 12 are estimated on the basis of only the measuring result of the GPS module. Note that the approximate latitude and longitude of the tracker 12 may not necessarily be measured by the GPS module. The approximate latitude and longitude of the tracker 12 may be identified on the basis of, for example, identification information (SSID (Service Set Identifier)) of a Wi-Fi (registered trademark) access point, information of a base station for cellular phones, information provided by a location service, or the like.

In addition, in the server 10, the common point clouds 50 may be managed via databases associated with periods of time, seasons, weather conditions, etc., for example. Then, in this case, the position and orientation of the tracker 12 may be estimated on the basis of a common point cloud 50 stored in a database associated with the period of time, season, weather condition, or the like at the time of the estimation, for example.

In addition, the captured images may be stored in the server 10 as textures for the common point cloud 50, the first individual point cloud 54, and the second individual point cloud 58, for example. These textures may be used in estimation employing machine learning, for example. In addition, on the basis of these textures, other textures may be generated.

In addition, three-dimensional shape data may be generated from the common point cloud 50, the first individual point cloud 54, and the second individual point cloud 58. The three-dimensional shape data may be used in estimation employing machine learning, for example.

In addition, in association with the data indicating the estimated position and orientation of the tracker 12, additional information (e.g., a tag) stored in the server 10 so as to be associated with the estimated position and orientation may be provided to the tracker 12.

In addition, on the basis of the received data indicating the position and orientation of the tracker 12, the tracker 12 may perform a process of causing the display section 38 to display a captured image of a road with an arrow for guidance fittingly superimposed thereon along the road in a navigation system, for example. According to the present embodiment, it can be expected that an arrow for guidance will be displayed with sufficient precision even by a visually impaired person.

In addition, the tracker 12 may perform a process of superimposing metadata, such as an advertisement, a rating and a word-of-mouth review for a restaurant, or a supplementary explanation of a sightseeing spot, on the basis of the received data indicating the position and orientation of the tracker 12, for example. Further, the tracker 12 may perform, for example, a process of causing a captured image with a virtual object superimposed thereon at an appropriate position and in an appropriate orientation to be displayed, or a process of eliminating a figure of an unnecessary person from a captured image or a captured moving image. Here, a figure of a person included in a captured image and a background image transmitted from the server 10 may be superimposed, for example.

In addition, the tracker 12 may perform a process in an AR (Augmented Reality) game, such as a treasure hunt game, a monster-collecting game, or a position-taking game, on the basis of the received data indicating the position and orientation of the tracker 12, for example. In this case, items or monsters may be arranged to appear predominantly in places with small numbers of textures and registered common point clouds 50, for example. This will make it easier to collect feature point data from the places with small numbers of textures and common point clouds 50.

In addition, the position sharing system 1 according to the present embodiment can also be used for a VR (Virtual Reality) theme park in which varied textures are displayed while the shape of a three-dimensional model is maintained and for automatic generation of real-world content based on a three-dimensional model, a texture, or the like.

In addition, the position sharing system 1 according to the present embodiment may be used in a trading situation in a virtual world. For example, a user who possesses a place in a virtual world may be enabled to add information, such as an advertisement, to the place.

Other possible applications of the position sharing system 1 according to the present embodiment include, for example, surveying, land management, disaster simulation, VR (Virtual Reality) travel, flight experience, automated walking, automated driving, and automated flight.

As described above, the tracker 12 according to the present embodiment is able to perform various processes on the basis of the received data indicating the position and orientation of the tracker 12.

Hereinafter, functions of the position sharing system 1 according to the present embodiment and processes performed in the position sharing system 1 will further be described.

Figure 16:
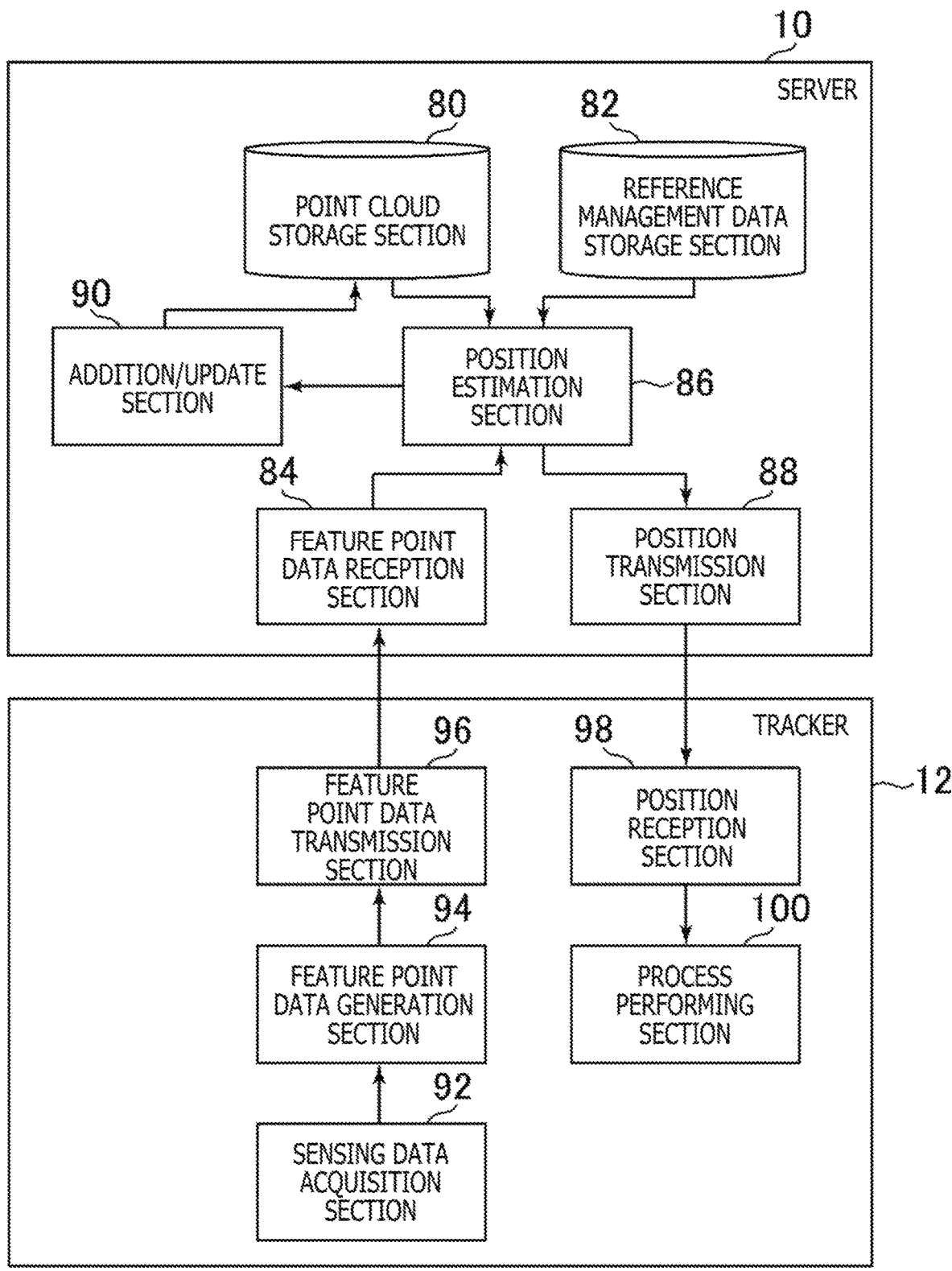
FIG. 16 is a functional block diagram illustrating examples of functions implemented in the position sharing system according to an embodiment of the present invention.

FIG. 16 is a functional block diagram illustrating examples of functions implemented in the position sharing system 1 according to the present embodiment. Note that the position sharing system 1 according to the present embodiment may not necessarily implement all of the functions illustrated in FIG. 16 and, further, may implement a function other than the functions illustrated in FIG. 16.

As illustrated in FIG. 16, the server 10 includes, in terms of function, for example, a point cloud storage section 80, a reference management data storage section 82, a feature point data reception section 84, a position estimation section 86, a position transmission section 88, and an addition/update section 90. Each of the point cloud storage section 80 and the reference management data storage section 82 is mainly implemented by the storage section 22. Each of the feature point data reception section 84 and the position transmission section 88 is mainly implemented by the communication section 24. Each of the position estimation section 86 and the addition/update section 90 is mainly implemented by the processor 20. The server 10 according to the present embodiment performs a role as a position transmission apparatus that transmits data indicating the position or orientation of the tracker 12 in the common coordinate system to the tracker 12.

The above functions may be implemented by the processor 20 executing a program installed in the server 10, which is a computer, the program containing commands corresponding to the above functions. This program may be supplied to the server 10, for example, through a computer-readable information storage medium, such as an optical disk, a magnetic disk, a magnetic tape, a magneto-optical disk, or a flash memory, or through the Internet or the like.

In addition, as illustrated in FIG. 16, the tracker 12 includes, in terms of function, for example, a sensing data acquisition section 92, a feature point data generation section 94, a feature point data transmission section 96, a position reception section 98, and a process performing section 100. The sensing data acquisition section 92 is mainly implemented by the processor 30 and the sensor section 40. Each of the feature point data generation section 94 and the process performing section 100 is mainly implemented by the processor 30. Each of the feature point data transmission section 96 and the position reception section 98 is mainly implemented by the communication section 34.

The above functions may be implemented by the processor 30 executing a program installed in the tracker 12, which is a computer, the program containing commands corresponding to the above functions. This program may be supplied to the tracker 12, for example, through a computer-readable information storage medium, such as an optical disk, a magnetic disk, a magnetic tape, a magneto-optical disk, or a flash memory, or through the Internet or the like.

In the present embodiment, for example, the point cloud storage section 80 stores point clouds to be referred to when the position or orientation of the tracker 12 is estimated, such as the common point cloud 50, the first individual point cloud 54, and the second individual point cloud 58.

Here, as described above, the common point cloud 50 is generated on the basis of the sensing data acquired by each of the trackers 12. In addition, as described above, the positions of the points 52 included in the common point cloud 50 are expressed using the common coordinate system shared by the trackers 12. The positions of the points 56 included in the first individual point cloud 54 are expressed using the first individual coordinate system. The positions of the points 60 included in the second individual point cloud 58 are expressed using the second individual coordinate system.

In the present embodiment, for example, the reference management data storage section 82 stores reference management data illustrated in FIG. 17. As illustrated in FIG. 17, the reference management data according to the present embodiment includes tracker IDs and reference point cloud data.

The tracker ID is identification information of the tracker 12. It is assumed here, for example, that the tracker ID of the tracker 12a is 001 and the tracker ID of the tracker 12b is 002.

The reference point cloud data is data representing a point cloud to be referred to in estimating the position or orientation of the tracker 12 identified by the tracker ID associated with the reference point cloud data. The reference management data illustrated in FIG. 17 indicates that the tracker 12a refers to the first individual point cloud 54 and that the tracker 12b refers to the second individual point cloud 58.

In the present embodiment, for example, the feature point data reception section 84 receives, from the tracker 12, the feature point data indicating the relative positions of the feature points. The feature point data reception section 84 receives, for example, first feature point data indicating the relative positions of the feature points from the tracker 12a. Here, the first feature point data may be expressed using a two-dimensional camera coordinate system defined on the two-dimensional plane formed by the captured image 62 or a three-dimensional camera coordinate system defined by the two-dimensional plane and a depth direction. In addition, the feature point data reception section 84 receives second feature point data indicating the relative positions of the feature points from the tracker 12b. Here, the second feature point data may be expressed using a two-dimensional camera coordinate system defined on the two-dimensional plane formed by the captured image 72 or a three-dimensional camera coordinate system defined by the two-dimensional plane and a depth direction.

In the present embodiment, for example, the position estimation section 86 estimates the position or orientation of the tracker 12 on the basis of the point cloud and the feature point data as described above. Here, the position estimation section 86 may identify, in the reference management data, the reference point cloud data associated with the tracker ID of the tracker 12 that has transmitted the feature point data received by the feature point data reception section 84. Then, the position estimation section 86 may estimate the position or orientation of the tracker 12 on the basis of the feature point data transmitted from the tracker 12 and the point cloud represented by the identified reference point cloud data.

In this case, the position or orientation of the tracker 12 may be expressed using the coordinate system in which the point cloud referred to is arranged. In the case where the common point cloud 50 is referred to when the position or orientation of the tracker 12a is estimated, for example, the position or orientation of the tracker 12a may be expressed using the common coordinate system. Meanwhile, in the case where the first individual point cloud 54 is referred to when the position or orientation of the tracker 12a is estimated, for example, the position or orientation of the tracker 12a may be expressed using the first individual coordinate system.

In the case where the common point cloud 50 is referred to when the position or orientation of the tracker 12b is estimated, for example, the position or orientation of the tracker 12b may be expressed using the common coordinate system. Meanwhile, in the case where the second individual point cloud 58 is referred to when the position or orientation of the tracker 12b is estimated, for example, the position or orientation of the tracker 12b may be expressed using the second individual coordinate system.

In addition, as described above, the position estimation section 86 may estimate the position or orientation of the tracker 12 using the direction of the tracker 12 measured by the magnetometer included in the sensor section 40 and/or the approximate latitude and longitude of the tracker 12 measured by the GPS module.

In the present embodiment, for example, the position transmission section 88 transmits, to the tracker 12, data indicating the position or orientation of the tracker 12 estimated by the position estimation section 86. Here, the position transmission section 88 transmits, to the tracker 12a, data indicating the position or orientation of the tracker 12a estimated by the position estimation section 86, for example. In addition, the position transmission section 88 transmits, to the tracker 12b, data indicating the position or orientation of the tracker 12b estimated by the position estimation section 86, for example.

Here, the position transmission section 88 may additionally transmit data indicating the position or orientation of the tracker 12b in the common coordinate system to the tracker 12a. In addition, the position transmission section 88 may additionally transmit data indicating the position or orientation of the tracker 12a in the common coordinate system to the tracker 12b.

In the present embodiment, for example, the addition/update section 90 performs the addition and update of the points included in the point cloud, on the basis of the feature point data received by the feature point data reception section 84 as described above. Here, as illustrated in FIG. 10, on the basis of the common point cloud 50 and the first feature point data, the points 52 arranged at those positions in the common coordinate system which are associated with the positions of feature points included in the first feature point data may be added to the common point cloud 50. In addition, as illustrated in FIG. 15, on the basis of the common point cloud 50 and the second feature point data, the points 52 arranged at those positions in the common coordinate system which are associated with the positions of feature points included in the second feature point data may be added to the common point cloud 50.

In addition, the addition/update section 90 may determine whether or not some of the points 52 included in the common point cloud 50 coincide with some of the points 56 included in the first individual point cloud 54. Then, when it is determined that there is such a coincidence, the points 52 which correspond to some of the points 56 included in the first individual point cloud 54 may be added to the common point cloud 50.

Here, when the above addition of the points 52 to the common point cloud 50 has been performed, for example, the addition/update section 90 may update a value of the reference point cloud data in the reference management data which includes the tracker ID of the tracker 12*a* to a "common point cloud." In this case, before the above addition of the points 52 to the common point cloud 50 is performed, the position estimation section 86 estimates the position or orientation of the tracker 12*a* in the first individual coordinate system on the basis of the first individual point cloud 54 and the first feature point data. In addition, after the above addition of the points 52 to the common point cloud 50 is performed, the position estimation section 86 estimates the position or orientation of the tracker 12*a* in the common coordinate system on the basis of the common point cloud 50 and the first feature point data. Thus, the coordinate system in which the estimated position or orientation of the tracker 12*a* is expressed is switched from the first individual coordinate system to the common coordinate system without an explicit operation by a user.

Similarly, the addition/update section 90 may determine whether or not some of the points 52 included in the common point cloud 50 coincide with some of the points 60 included in the second individual point cloud 58. Then, when it is determined that there is such a coincidence, the points 52 which correspond to some of the points 60 included in the second individual point cloud 58 may be added to the common point cloud 50.

Here, when the above addition of the points 52 to the common point cloud 50 has been performed, for example, the addition/update section 90 may update a value of the reference point cloud data in the reference management data which includes the tracker ID of the tracker 12*b* to a "common point cloud." In this case, before the above addition of the points 52 to the common point cloud 50 is performed, the position estimation section 86 estimates the position or orientation of the tracker 12*b* in the second individual coordinate system on the basis of the second individual point cloud 58 and the second feature point data. In addition, after the above addition of the points to the common point cloud 50 is performed, the position estimation section 86 estimates the position or orientation of the tracker 12*b* in the common coordinate system on the basis of the common point cloud 50 and the second feature point data. Thus, the coordinate system in which the estimated position or orientation of the tracker 12*b* is expressed is switched from the second individual coordinate system to the common coordinate system without an explicit operation by a user.

In the present embodiment, for example, the sensing data acquisition section 92 acquires the sensing data generated by the sensor section 40. Here, the sensing data acquisition section 92 may acquire a captured image, direction data, data indicating a latitude and a longitude, and/or the like.

In the present embodiment, for example, the feature point data generation section 94 generates the feature point data on the basis of the sensing data acquired by the sensing data acquisition section 92. Here, as described above, the feature point data generation section 94 may extract plural feature points from the captured image and generate the feature point data indicating the relative positions of the extracted feature points.

In the present embodiment, for example, the feature point data transmission section 96 transmits the feature point data generated by the feature point data generation section 94 to the server 10. Here, the feature point data transmission section 96 may transmit, to the server 10, the captured image, the direction data, the data indicating the latitude and the longitude, and/or the like as well.

In the present embodiment, for example, the position reception section 98 receives the data indicating the position or orientation, which has been transmitted by the position transmission section 88 of the server 10.

In the present embodiment, for example, the process performing section 100 performs a process based on the position or orientation indicated by the data received by the position reception section 98. As described above, various processes, such as a process in a game and a navigation process, can be performed in the process performing section 100.

In addition, as described above, the point cloud storage section 80 may store plural point clouds each of which is associated with an area.

Then, the feature point data transmission section 96 may acquire position information indicating the position of the tracker 12 and transmit the position information to the server 10. Here, the position information may be, for example, information indicating the latitude and longitude of the tracker 12 measured by the GPS module included in the sensor section 40 of the tracker 12. In addition, the position information may be generated on the basis of identification information (SSID) of a Wi-Fi (registered trademark) access point, information of a base station for cellular phones, information provided by a location service, or the like.

Then, the position estimation section 86 may acquire the position information transmitted from the tracker 12. Then, the position estimation section 86 may select, from among the plural point clouds stored in the point cloud storage section 80, a point cloud associated with an area including the position indicated by the position information transmitted from the tracker 12.

Then, the position estimation section 86 may estimate the position or orientation of the tracker 12 on the basis of the selected point cloud and the feature point data indicating the relative positions of the feature points, which is generated on the basis of the sensing data acquired by the tracker 12.

Then, the position transmission section 88 may transmit the data indicating the estimated position or orientation of the tracker 12 to the tracker 12. Then, the position reception section 98 of the tracker 12 may receive the data indicating the position or orientation of the tracker 12.

Figure 18:
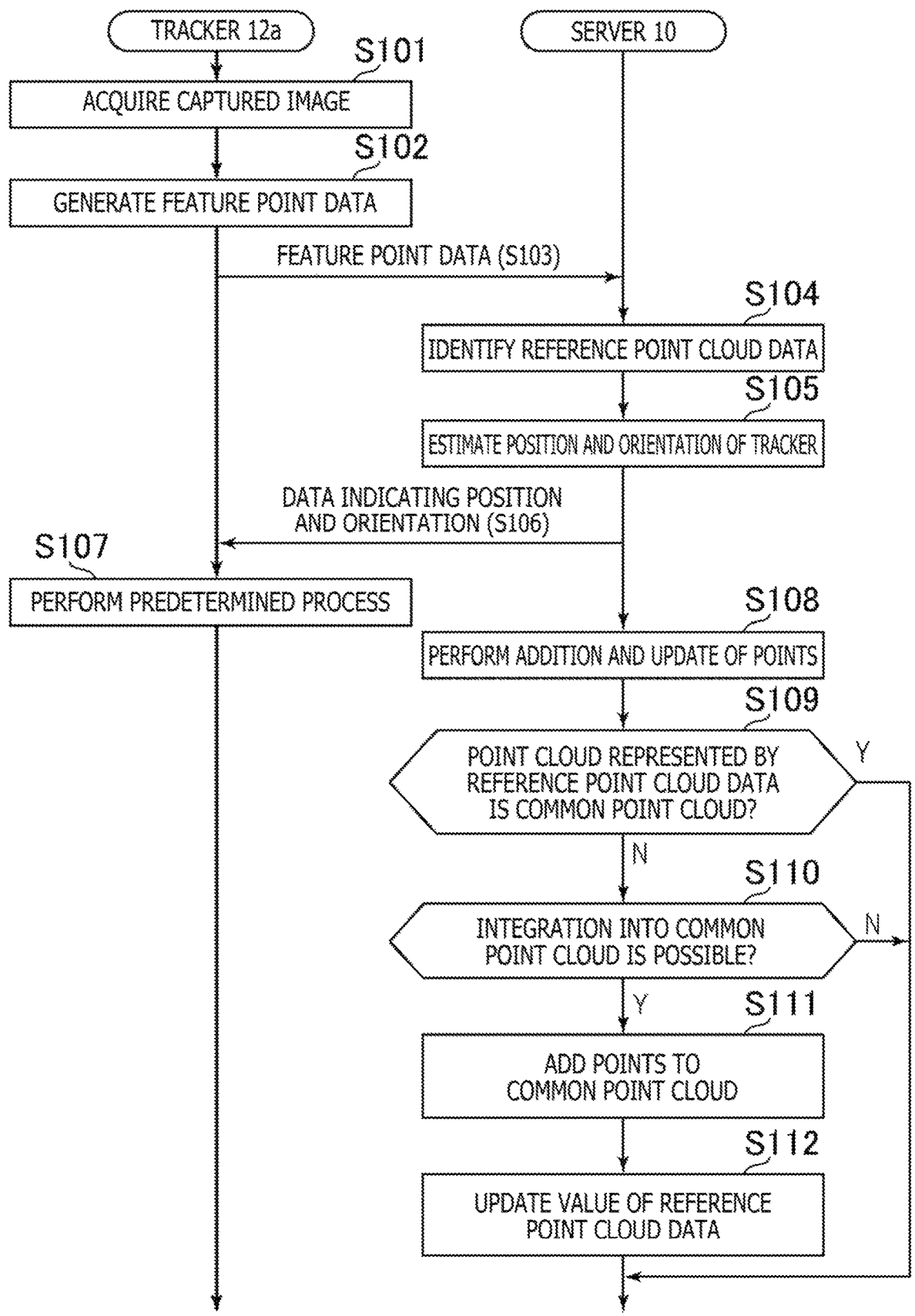
FIG. 18 is a flowchart illustrating an example of a procedure performed in the position sharing system according to an embodiment of the present invention.

Here, an example of a procedure performed by the tracker 12*a* and the server 10 according to the present embodiment will be described below with reference to a flowchart illustrated in FIG. 18. In this example of procedure, processes of S101 to S112, which will be described below, are repeatedly performed at the predetermined frame rate.

First, the sensing data acquisition section 92 of the tracker 12a acquires a captured image captured by the camera of the sensor section 40 (S101).

Then, the feature point data generation section 94 of the tracker 12a extracts plural feature points from the captured image acquired in the process of S101 and generates the feature point data indicating the respective positions of the extracted feature points (S102).

Then, the feature point data transmission section 96 of the tracker 12a transmits the feature point data generated in the process of S102 to the server 10. Then, the feature point data reception section 84 of the server 10 receives the transmitted feature point data (S103). It is assumed here that the tracker ID of the tracker 12a, which has transmitted the feature point data, is associated with the transmitted feature point data.

Then, the position estimation section 86 of the server 10 identifies the tracker ID associated with the feature point data received in the process of S103. Then, the position estimation section 86 of the server 10 identifies the reference point cloud data associated with the identified tracker ID in the reference management data stored in the reference management data storage section 82 (S104).

Then, the position estimation section 86 of the server 10 estimates the position and orientation of the tracker 12a on the basis of the point cloud represented by the reference point cloud data identified in the process of S104 and the feature point data received in the process of S103 (S105). The position and orientation estimated here are expressed using a coordinate system of a virtual space in which the point cloud represented by the reference point cloud data identified in the process of S104 is arranged.

Then, the position transmission section 88 of the server 10 transmits, to the tracker 12a, data indicating the position and orientation of the tracker 12a estimated in the process of S105. Then, the position reception section 98 of the tracker 12a receives this data (S106).

Then, the process performing section 100 of the tracker 12a performs a predetermined process on the basis of the data indicating the position and orientation of the tracker 12a received in the process of S106 (S107).

Then, the addition/update section 90 of the server 10 performs addition of points to the point cloud used in the process of S105 and update of the points included in the point cloud, on the basis of the feature point data received in the process of S103 (S108). Note that the process of S108 may be performed after the process of S106 is performed.

Then, the addition/update section 90 of the server 10 determines whether or not the point cloud represented by the reference point cloud data identified in the process of S104 is a common point cloud 50 (S109).

If it is determined that the point cloud represented by the reference point cloud data identified in the process of S104 is a common point cloud 50 (S109: Y), this cycle of processes in this example of procedure is ended.

Suppose that the point cloud represented by the reference point cloud data identified in the process of S104 is determined as not being a common point cloud 50 (S109: N). In this case, the addition/update section 90 of the server 10 compares the point cloud subjected to the process of S108 with a common point cloud 50 to determine whether or not it is possible to integrate this point cloud into the common point cloud 50 (S110). Here, it may be determined whether or not some of the points 56 included in the common point cloud 50 coincide with some of the points included in the point cloud subjected to the process of S108, for example.

Here, if it is determined that there is such a coincidence, it may be determined that the integration is possible, whereas if it is determined that there is no such coincidence, it may be determined that the integration is not possible.

Here, if it is determined that the integration into the common point cloud 50 is not possible (S110: N), this cycle of processes in this example of procedure is ended.

Meanwhile, suppose that the integration into the common point cloud 50 is determined to be possible (S110: Y). In this case, the addition/update section 90 adds, to the common point cloud 50, points corresponding to some of the points included in the point cloud subjected to the process of S108 (S111). At this time, the update of the points included in the common point cloud 50 may be performed.

Then, the addition/update section 90 updates the value of the reference point cloud data in the reference management data which includes the tracker ID of the tracker 12a to a "common point cloud" (S112), and this cycle of processes in this example of procedure is ended.

Note that it may happen that, in the process of S105 in the above-described example of procedure, the position estimation section 86 fails to estimate the position and orientation of the tracker 12a on the basis of the first individual point cloud 54 and the feature point data received in the process of S103. In this case, the position estimation section 86 may estimate the position and orientation of the tracker 12a on the basis of the common point cloud 50 and the feature point data received in the process of S103.

The processes in the above-described example of procedure are similarly performed by the tracker 12b and the server 10 as well.

Note that the present invention is not limited to the above-described embodiment.

For example, the roles of the server 10 and the tracker 12 may be divided therebetween in a manner different from that described above. For example, the feature point data generation section 94 of the tracker 12, for example, may alternatively be implemented in the server 10. In this case, the feature point data transmission section 96 of the tracker 12 may transmit the sensing data, such as the captured image, acquired by the sensing data acquisition section 92 to the server 10. Then, the feature point data generation section 94 in the server 10 may generate the feature point data on the basis of the sensing data received from the tracker 12.

In addition, for example, the functions of the point cloud storage section 80, the reference management data storage section 82, the position estimation section 86, and the addition/update section 90 illustrated in FIG. 16 may be implemented in the tracker 12, instead of the server 10.

Also note that specific character strings and numerical values mentioned above and specific character strings and numerical values illustrated in the drawings are merely examples and that those character strings and numerical values are not restrictive.

The invention claimed is:

1. A position estimation apparatus comprising:
    a point cloud storage section that stores a common point cloud with positions expressed using a common coordinate system; and
    an estimation section that estimates a position or orientation of a first tracker in the common coordinate system and a position or orientation of a second tracker in the common coordinate system, wherein
    the estimation section estimates the position or orientation of the first tracker in the common coordinate system on a basis of the common point cloud and first feature point data indicating relative positions of plural feature points and generated on a basis of first sensing data acquired by the first tracker, and the estimation section estimates the position or orientation of the second tracker in the common coordinate system on a basis of the common point cloud and second feature point data indicating relative positions of plural feature points and generated on a basis of second sensing data acquired by the second tracker, wherein the point cloud storage section further stores an individual point cloud with positions expressed using an individual coordinate system different from the common coordinate system, the position estimation apparatus further comprises an addition section that adds, to the common point cloud, points corresponding to some of points included in the individual point cloud when it is determined that some of plural points included in the common point cloud coincide with some of the points included in the individual point cloud, before the addition of the points corresponding to the some of the points included in the individual point cloud to the common point cloud is performed, the estimation section estimates a position or orientation of the first tracker in the individual coordinate system on a basis of the individual point cloud and the first feature point data, and after the addition of the points corresponding to the some of the points included in the individual point cloud to the common point cloud is performed, the estimation section estimates the position or orientation of the first tracker in the common coordinate system on a basis of the common point cloud and the first feature point data.

2. The position estimation apparatus according to claim 1, further comprising:

a transmission section, wherein the transmission section transmits data indicating the position or orientation of the first tracker in the common coordinate system to the first tracker, and the transmission section transmits data indicating the position or orientation of the second tracker in the common coordinate system to the second tracker.

3. The position estimation apparatus according to claim 2, wherein the transmission section further transmits the data indicating the position or orientation of the second tracker in the common coordinate system to the first tracker, and the transmission section further transmits the data indicating the position or orientation of the first tracker in the common coordinate system to the second tracker.

4. The position estimation apparatus according to claim 1, wherein the addition section adds, to the common point cloud, a point or points arranged at a position or positions in the common coordinate system, on a basis of the common point cloud and the first feature point data, the position or positions being associated with a position or positions of one or more of the feature points included in the first feature point data.

5. The position estimation apparatus according to claim 1, further comprising:

a reception section, wherein the reception section receives the first feature point data from the first tracker, the reception section receives the second feature point data from the second tracker, the estimation section estimates the position or orientation of the first tracker in the common coordinate system on a basis of the first feature point data received by the reception section, and the estimation section estimates the position or orientation of the second tracker in the common coordinate system on a basis of the second feature point data received by the reception section.

6. The position estimation apparatus according to claim 1, further comprising:

a reception section; and a feature point data generation section that generates the first feature point data and the second feature point data, wherein the reception section receives the first sensing data from the first tracker, the reception section receives the second sensing data from the second tracker, the feature point data generation section generates the first feature point data on a basis of the received first sensing data, the feature point data generation section generates the second feature point data on a basis of the received second sensing data, the estimation section estimates the position or orientation of the first tracker in the common coordinate system on a basis of the first feature point data generated by the feature point data generation section, and the estimation section estimates the position or orientation of the second tracker in the common coordinate system on a basis of the second feature point data generated by the feature point data generation section.

7. A position estimation method comprising:

storing a common point cloud with positions expressed using a common coordinate system;

estimating a position or orientation of a first tracker in a common coordinate system on a basis of a common point cloud with positions expressed using the common coordinate system and first feature point data indicating relative positions of plural feature points and generated on a basis of first sensing data acquired by the first tracker;

estimating the position or orientation of the first tracker in the common coordinate system on a basis of the common point cloud and first feature point data indicating relative positions of plural feature points and generated on a basis of first sensing data acquired by the first tracker;

estimating a position or orientation of a second tracker in the common coordinate system on a basis of the common point cloud and second feature point data indicating relative positions of plural feature points and generated on a basis of second sensing data acquired by the second tracker;

storing an individual point cloud with positions expressed using an individual coordinate system different from the common coordinate system;

adding, to the common point cloud, points corresponding to some of points included in the individual point cloud when it is determined that some of plural points included in the common point cloud coincide with some of the points included in the individual point cloud;

before the addition of the points corresponding to the some of the points included in the individual point cloud to the common point cloud is performed, estimating a position or orientation of the first tracker in the individual coordinate system on a basis of the individual point cloud and the first feature point data, and after the addition of the points corresponding to the some of the points included in the individual point cloud to the common point cloud is performed, estimating the position or orientation of the first tracker in the common coordinate system on a basis of the common point cloud and the first feature point data.

8. A non-transitory computer readable medium having stored thereon a program for a computer, comprising:

by an estimation section, estimating a position or orientation of a first tracker in a common coordinate system on a basis of a common point cloud with positions expressed using the common coordinate system and first feature point data indicating relative positions of plural feature points and generated on a basis of first sensing data acquired by the first tracker; and by the estimation section, a step of estimating a position or orientation of a second tracker in the common coordinate system on a basis of the common point cloud and second feature point data indicating relative positions of plural feature points and generated on a basis of second sensing data acquired by the second tracker, wherein the point cloud storage section further stores an individual point cloud with positions expressed using an individual coordinate system different from the common coordinate system, the position estimation apparatus further comprises an addition section that adds, to the common point cloud, points corresponding to some of points included in the individual point cloud when it is determined that some of plural points included in the common point cloud coincide with some of the points included in the individual point cloud, before the addition of the points corresponding to the some of the points included in the individual point cloud to the common point cloud is performed, the estimation section estimates a position or orientation of the first tracker in the individual coordinate system on a basis of the individual point cloud and the first feature point data, and after the addition of the points corresponding to the some of the points included in the individual point cloud to the common point cloud is performed, the estimation section estimates the position or orientation of the first tracker in the common coordinate system on a basis of the common point cloud and the first feature point data.

\* \* \* \* \*